United States Patent [19]

Foldvary

[11] Patent Number: 4,886,711

[45] Date of Patent: Dec. 12, 1989

[54] CATALYTIC CONVERTER METAL MONOLITHIC CATALYST SUBSTRATE

[75] Inventor: Leslie A. Foldvary, Bancroft, Mich.

[73] Assignee: General Motors Corporation, Detroit, Mich.

[21] Appl. No.: 209,117

[22] Filed: Jun. 20, 1988

Related U.S. Application Data

[63] Continuation-in-part of Ser. No. 125,929, Nov. 27, 1987, abandoned.

[51] Int. Cl.$^4$ .............................................. B01J 35/04
[52] U.S. Cl. .................................... 428/592; 502/439; 502/527
[58] Field of Search .................. 428/592, 593; 72/147, 72/139, 148; 242/78.1; 502/439, 527; 422/180

[56] References Cited

U.S. PATENT DOCUMENTS

| | | | |
|---|---|---|---|
| 2,067,801 | 1/1937 | Taylor | 428/592 |
| 3,352,649 | 11/1967 | Tennison | 428/592 |
| 3,557,592 | 1/1971 | Corns | 420/592 |
| 4,152,302 | 5/1979 | Nonnenman et al. | 502/527 |
| 4,160,371 | 7/1979 | Wilkening et al. | 72/147 |
| 4,162,993 | 7/1979 | Retallick | 428/592 |
| 4,221,843 | 9/1980 | Mundy | 428/592 |
| 4,300,956 | 11/1981 | Rosenberger et al. | 72/147 |
| 4,394,422 | 7/1983 | Van Thyne et al. | 428/592 |
| 4,433,064 | 2/1984 | Pignon | 502/527 |
| 4,467,632 | 8/1984 | Klappert | 72/147 |
| 4,598,063 | 7/1986 | Retallick | 502/527 |
| 4,637,568 | 1/1987 | Cornelism | 422/180 |

FOREIGN PATENT DOCUMENTS

| 2001547 | 2/1979 | United Kingdom | 502/439 |
|---|---|---|---|
| 1591191 | 6/1981 | United Kingdom | 502/527 |

Primary Examiner—John J. Zimmerman
Attorney, Agent, or Firm—Karl F. Barr, Jr.

[57] ABSTRACT

A motor vehicle catalytic converter monolith metal foil catalyst substrate having foil wrapped around a center pin and contained within a housing wherein the pin housing and the layers of metal foil therebetween are configured to mechanically lock the latter in place to prevent their telescoping.

13 Claims, 3 Drawing Sheets

4,886,711

CATALYTIC CONVERTER METAL MONOLITHIC CATALYST SUBSTRATE

This is a continuation-in-part of application Ser. No. 125,929, filed Nov. 27, 1987 (now abandoned).

TECHNICAL FIELD

This invention relates to catalytic converter metal monolith catalyst substrates and more particularly to mechanically preventing telescoping of the metal foil layers therein.

BACKGROUND OF THE INVENTION

For the manufacture of metal monolith catalytic converters for use in motor vehicle exhaust systems to reduce certain engine exhaust gases, it has been proposed to wind a strip of herringbone or strips of corrugated and flat stainless steel foil to form a metallic substrate unit. This unit is then coated with a suitable catalyst and is typically either inserted in a housing or itself has a shell to which inlet and outlet housing pieces are added to complete the catalytic converter assembly. There are, however, problems with a wound foil substrate that result from vibrational, thermal and flow-imposing stresses which can cause the foil layers to telescope, i.e. adjacent layers of the foil slip past each other in an axial direction, thereby unraveling the substrate. This can occur with both herringbone foils and flat-corrugated foils. Heretofore, the solutions to this problem have been to braze or weld the foil layers together or to provide some mechanical means of holding the substrate together such as with end retainer rings, pins, staples and/or interlocking features on the foil itself. While such previous solutions have proved generally satisfactory, they also incur significant costs to the manufacture of the substrate.

SUMMARY OF THE PRESENT INVENTION

The present invention provides a relatively inexpensive mechanical solution to the telescoping or unraveling problem with a unique configuration of both a center pin and shell, and conforming foil layers therebetween, to prevent their relative axial movement. According to the present invention, there is provided a center pin having an irregular non-cylindrical surface with a radius that varies axially along the pin so as to form a radially extending axial interference profile. The herringbone or corrugated and flat stainless steel foil is wound about and formed against the center pin so as to conform to the surface thereof. An outer shell or housing is then provided that extends about the foil and has a shape corresponding to that of the foil wrapped center pin and clamps the foil layers against the latter in compression. By virtue of the interference profile of both the center pin and the shell, the foil layers are caused to have nested angular portions inclined to their axial direction that mechanically lock the foil layers in place preventing their relative axial movement or unraveling during use. The center pin and corresponding housing may take various axial interference forms. For example, a double reverse taper, a singular concave profile, a profile with a plurality of concave or wedge-shaped grooves and a profile with an intermediately located annular radial projection. In addition, it is proposed to provide relief areas in the foil to ensure that the foil follows the pin contour during the winding so as to prevent buckling and/or distortion of the foil. For example, longitudinal slots or lances may be formed in the foil at the angular nesting location(s). It is further contemplated that the center pin be of hollow design formed of sheet metal and that the foil be preformed to conform to the pin profile.

An object of the present invention is to provide a catalytic converter having a metal foil catalyst substrate wherein metal foil is wound about a solid or hollow pin whose profile, together with that of a surrounding housing pressing on the foil, positively prevents the foil layers from telescoping.

Another object of the present invention is to provide a metal foil catalyst substrate having a center pin with an axially locking profile about which metal foil is wound and conformed thereto and which cooperates with a shell of corresponding shape to lock the metal foil layers against relative movement.

Another object of the present invention is to provide a metal foil catalyst substrate having metal foil wound around a center pin and contained in a housing wherein the pin and housing are both configured so as to provide an axial interference profile to which the foil is made to conform to lock the foil layers against telescoping by preforming of the foil or during assembly of the housing.

Another object of the present invention is to provide a metal foil catalyst substrate having metal foil wound around a center pin and contained in housing wherein the pin and housing are both configured so as to provide an axial interference profile to which the foil is made to conform to lock the foil layers against telescoping and wherein relief areas are formed in the foil to prevent buckling and/or distortion of the foil during winding about the center pin.

These and other objects, advantages and features of the present invention will become more apparent from the following description and drawing in which.

Figure 1:
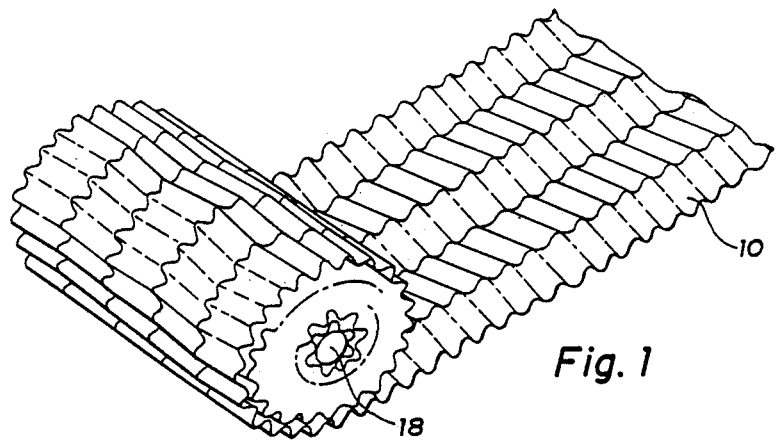
FIG. 1 is a pictorial view of a strip of herringbone metal foil being wound on a center pin to produce a catalyst substrate according to the present invention.
Figure 2:
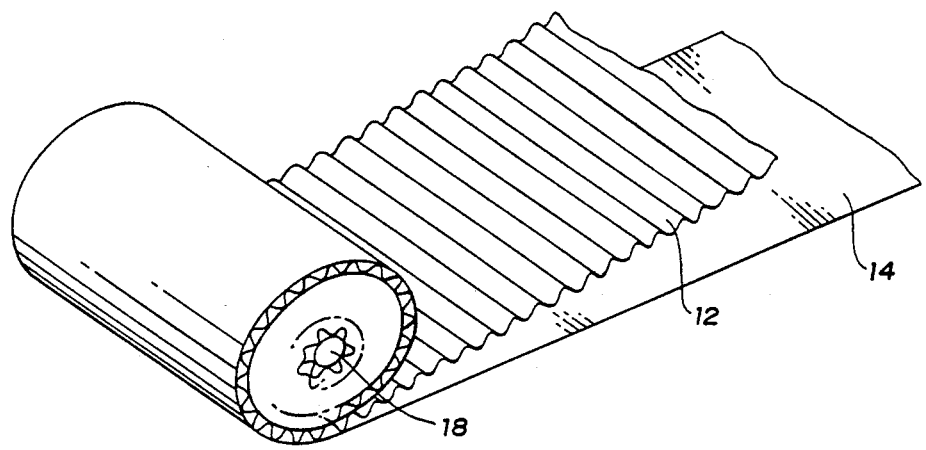
FIG. 2 is a pictorial view similar to FIG. 1 but showing the winding of strips of corrugated and flat metal foil being wound on the center pin.
Figure 3:
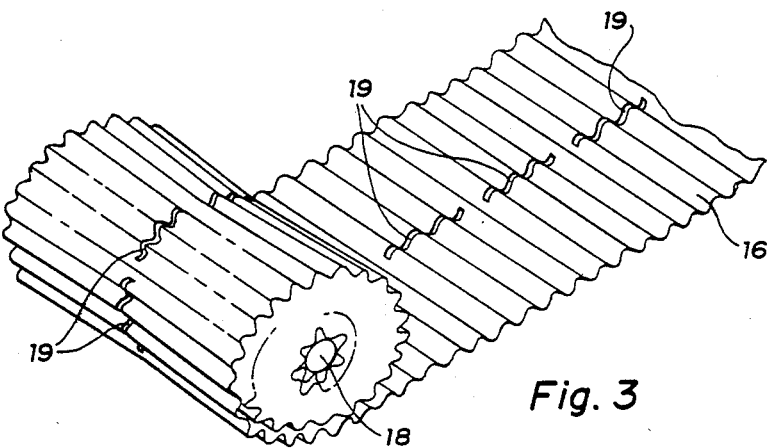
FIG. 3 is a pictorial view similar to FIGS. 1 and 2 but showing a strip of corrugated foil with stress relief areas therein being wound on the center pin.
Figure 4:
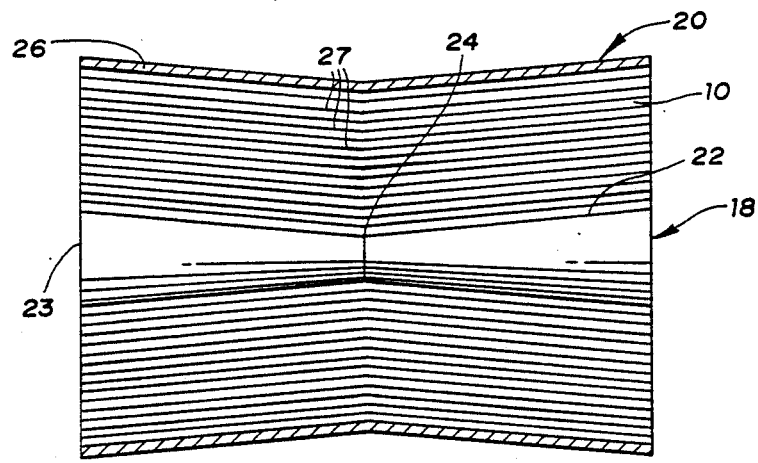
FIG. 4 is a longitudinal sectional view of one embodiment of the catalytic converter metal foil catalyst substrate constructed according to the present invention.
Figure 5:
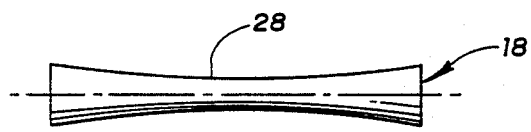
FIGS. 5–8 are side views of various alternative forms of the center pin according to the present invention.

Referring to FIGS. 1, 2 and 3, there is shown respectively a strip of stainless steel herringbone 10, strips of corrugated and flat stainless steel foil 12 and 14, and corrugated stainless steel foil 16 with stress relief slots 19 being wound around a stainless steel center pin 18 to form a metallic catalyst substrate unit which in final form appears as the assembly 20 shown in FIG. 4. In the substrate unit embodiment shown in FIG. 4 which will be understood to have either of the foil windings in FIGS. 1–3, the center pin 18 has a surface 22 that uniformly tapers radially inward from its two outer ends 23 to its center 24. The resulting profile which may be described as a double reverse taper or low profile V-groove provides axial interference to and in the foil as the latter is wound about and forced to conform to the pin profile in parallel layers throughout the substrate as seen in this view. Following the final wrap or wind of the foil, either a single seam or double seam tubular housing or shell 26 is located about the thus wound foil and formed by radially inwardly applied pressure with rollers or other suitable tube forming tools to conform to the profile of the center pin like the previously formed layers of foil whereafter the shell is then seam welded to compressively hold the foil layers in place in such deformed state. As a result, the double reverse taper profile of the pin and the corresponding form of the shell or housing act to mechanically lock the foil layers in place preventing axial movement during use. As seen in FIG. 4, the nesting at the center of the angular portions 27 by the foil layers prevents the sliding of the adjacent foils with respect to each other without requiring any actual attachment of the layers.

Various alternative center pin designs can be used as shown in FIGS. 5-8. In the FIG. 5 embodiment, the center pin 18 is provided with a singular concave profile 28 of constant or varying slope on which the foil is wrapped to conform therewith and a shell is then also conformed after the manner of that in FIG. 4 to complete the substrate assembly.

Figure 6:
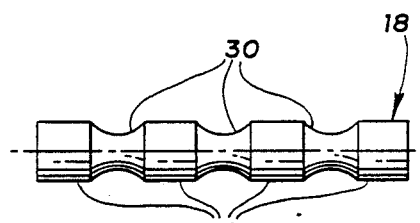

In the FIG. 6 embodiment, the center pin 18 is provided with a plurality (three shown) of concave annular grooves 30 separated by cylindrical lands 32. In this case, the metal foil on being when wrapped about the center pin is caused to conform to the concave annular grooves and then the shell is similarly conformed thereabout after the manner of that in FIG. 4 so that there are now a plurality of changes in direction in the foil layers to prevent their relative sliding.

Figure 7:
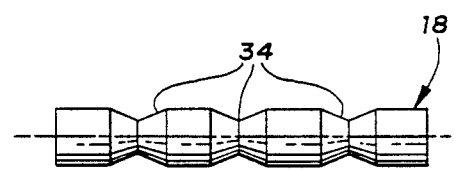

In the FIG. 7 embodiment, the center pin 18 is like the center pin in FIG. 6 but with a plurality of annular grooves 34 that have a V-shape rather than a concave shape and with the foil and the outer shell then conformed accordingly thereto after the manner of that in FIG. 4.

Figure 8:
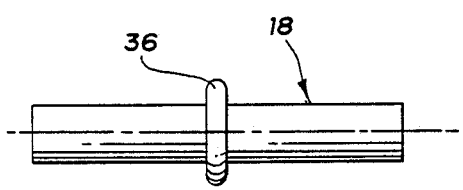

In the FIG. 8 embodiment, the center pin 18 is simply provided with a singular annular raised bead 36 intermediate its ends and about which the layers of foil and eventually the outer shell are caused to to conform thereto after the manner of that in FIG. 4 to positively interlock the foil layers but now with a raised axially interfering profile.

Moreover, it will also be understood that in all the above embodiments, the center pin and consequently the foil layers and outer shell may have a circular, oval or polygon cross section depending on the converter profile desired.

Depending on the corrugation of the foil and the degree of pin contour, the foil may have a tendency to buckle and/or distort during its winding thereon. To prevent such buckling and/or distortion, the foil may be formed with stress relief areas such as the longitudinal slots 38 shown in the corrugated foil 16 in FIG. 3. In this case, the longitudinal slots are located at the highest stress area which in the case of the pin 18 with the double reverse taper 22 is at the center thereof. However, it will also be appreciated that while the relief areas have been shown as being provided by longitudinal slots, it is also contemplated that such may be provided by lances or cuts in the foil and also that the configurations and locations thereof may be altered depending on the required degree and location of stress relief needed during the winding to ensure the foil layers run parallel to each other throughout the substrate.

Figure 9:
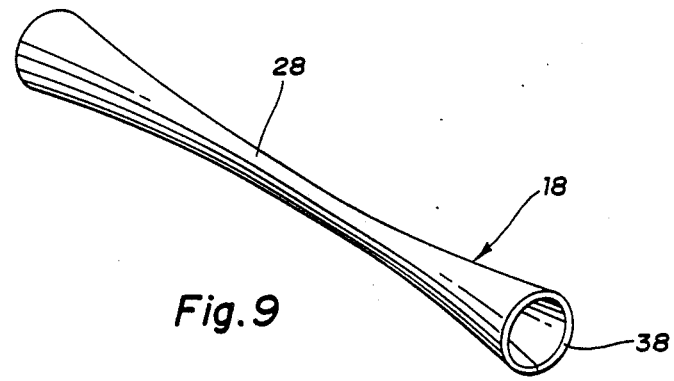
FIG. 9 is a representative pictorial view of an alternative construction of the center pin.

In addition to the various alternative center pin designs in FIGS. 4-8 which are all solid pins, it is also contemplated that identical or similarly shaped pins can be of hollow thin wall design as shown in FIG. 9. In these embodiments, the center pin 18 is simply made from a sheet metal sleeve 38 that is form rolled or spun to the desired interference shape as represented by the concave profile 28 thereshown taken from the solid center pin design in FIG. 5.

Figure 10:
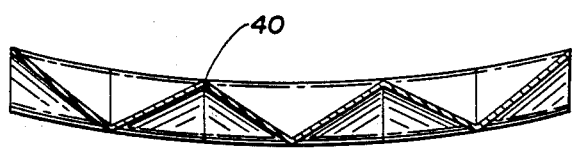
FIG. 10 is a representative cross sectional view of an alternative construction of the foil wrap for the center pins.

Moreover, it is also contemplated that instead of lances or slots in the relief to allow the foil to conform to the center pin without cracking, the foil may be preshaped for example during the corrugation forming so that it has the same shape as the pin. This is illustrated in FIG. 10 wherein there is shown corrugated foil 40 that was also shaped during the corrugation forming operation to conform to the pin form in FIGS. 5 and 9 prior to winding thereon.

It will thus be appreciated by those skilled in the art that there is provided by all these embodiments a solid or hollow thin wall center pin with a non-cylindrical surface having an axial interference profile against which the strip(s) of foil is first conformed thereto and thereafter the outer shell or housing to provide mechanical interlocking of the foil layers compressively maintained between the pin and housing. Furthermore, it will be understood that the thus constructed substrate 20 in either of its various forms is the central component of a final catalytic converter assembly. For example, following cleaning and then coating of the substrate with a suitable catalyst, it is contemplated that two funnel-shaped parts may be welded to the ends of the shell 26 to form an inlet and outlet to complete the catalytic converter assembly as disclosed in U.S. Pat. No. 4,559,205 assigned to the assignee of this invention and which is hereby incorporated by reference.

The foregoing description of the preferred embodiments of the invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A catalytic converter metal monolith catalyst substrate, having first and second axial end portions and an axial central portion, said substrate comprising a center pin having a surface with an axial interference profile, a strip of metal foil wound about and conforming in parallel layers to the surface of said pin, and a tubular shell extending about said foil and conforming to the profile of said layers of foil, said axial end portions having a circular cross section of a first diameter and said central portion having a circular cross section of a second diameter, whereby the pin and shell cooperate to mechanically lock the layers of metal foil together to prevent their relative movement.

2. A catalytic converter metal monolith catalyst substrate as defined in claim 1 wherein said axial interference profile is a double reverse taper.

3. A catalytic converter metal monolith catalyst substrate as defined in claim 1 wherein said axial interference profile is formed by a singular concave curve.

4. A catalytic converter metal monolith catalyst substrate as defined in claim 1 wherein said axial interference profile is formed by a plurality of axially spaced annular grooves.

5. A catalytic converter metal monolith catalyst substrate as defined in claim 1 wherein said axial interference profile is formed by an annular raised bead located intermediate the ends of the pin.

6. A catalytic converter metal monolith catalyst substrate, as defined in claim 1, further comprising stress relief regions formed on said foil to reduce deformation of said foil when would about said center pin.

7. A catalytic converter metal monolith catalyst substrate, as defined in claim 6, said stress relief regions comprising longitudinally extending openings formed in said foil.

8. A catalytic converter metal monolith catalyst substrate, as defined in claim 1, wherein said foil is preformed with a cross section corresponding to said pin.

9. A catalytic converter metal monolith catalyst substrate, having first and second axial end portions and an axial central portion extending between said end portions, said substrate comprising a center pin having a surface with a radius that varies at a location axially along the pin so as to form an axial interference profile, a strip of metal foil wound about and conforming in parallel layers to the surface of said pin, and a tubular shell extending about said foil and conforming to the profile of said layers of foil, said axial end portions having a circular cross section of a first diameter and said central portion having a circular cross section which varies from said first diameter, whereby the pin and shell cooperate to mechanically lock the layers of metal foil together to prevent their relative movement.

10. A catalytic converter metal monolith catalyst substrate comprising a center pin having a surface with a radius that varies axially along the pin so as to form a radially inwardly extending interference profile, a strip of metal foil wound about and conforming in parallel layers to the surface of said pin, and a tubular shell extending about said foil and conforming to the profile of said layers of foil whereby the pin and shell cooperate to mechanically lock the layers of metal foil together to prevent their relative movement.

11. A catalytic converter metal monolith catalyst substrate comprising a center pin having a surface with a radius that varies axially along the pin so as to from a radially outwardly extending interference profile, a strip of metal foil wound about and conforming in parallel layers to the surface of said pin, and a tubular shell extending about said foil and conforming to the profile of said layers of foil whereby the pin and shell cooperate to mechanically lock the layers of metal foil together to prevent their relative movement.

12. A catalytic converter metal monolith catalyst substrate, having first and second axial end portions and an axial central portion, said substrate comprising a hollow center pin formed of sheet metal having a surface with an axial interference profile, a strip of metal foil wound about and conforming in parallel layers to the surface of said pin, and a tubular shell extending about said foil and conforming to the profile of said layers of foil, said axial end portions having a circular cross section of a first diameter and said central portion having a circular cross section of a second diameter, whereby the pin and shell cooperate to mechanically lock the layers of metal foil together to prevent their relative movement.

13. A catalytic converter metal monolith catalyst substrate, said axial end portions having a circular cross section of a first diameter and said central portion having a circular cross section of a second diameter, comprising a center pin having a surface with an axial interference profile, a strip of metal foil wound about said pin and preformed so as to conform in parallel layers to the surface of said pin, and a tubular shell extending about said foil and conforming to the profile of said layers of foil, said axial end portions having a circular cross section of a first diameter and said central portion having a circular cross section of a second diameter, whereby the pin and shell cooperate to mechanically lock the layers of metal foil together to prevent their relative movement.

* * * * *